US011287055B2

(12) United States Patent
Bao et al.

(10) Patent No.: US 11,287,055 B2
(45) Date of Patent: Mar. 29, 2022

(54) EXECUTIVE SYSTEM FOR DRIVING A VALVE TO OPEN AND CLOSE (71) Applicant: NEWAY VALVE (SUZHOU) CO., LTD., Jiangsu (CN)

(72) Inventors: Yueqiang Bao, Jiangsu (CN); Xiaoping Chen, Jiangsu (CN); Zhengwen Wang, Jiangsu (CN)

(*) Notice: Subject to any disclaimer, the term of this patent is extended or adjusted under 35 U.S.C. 154(b) by 146 days.

(21) Appl. No.: 16/618,193

(22) PCT Filed: Dec. 25, 2018

(86) PCT No.: PCT/CN2018/123643
§ 371 (c)(1),
(2) Date: Nov. 29, 2019

(87) PCT Pub. No.: WO2019/205689
PCT Pub. Date: Oct. 31, 2019

(65) Prior Publication Data
US 2020/0182373 A1 Jun. 11, 2020

(30) Foreign Application Priority Data
Apr. 24, 2018 (CN) .......................... 201810373112.X (51) Int. Cl.
*F16K 31/53* (2006.01)
*F16K 31/122* (2006.01)
(Continued)

(52) U.S. Cl.
CPC .......... *F16K 31/53* (2013.01); *F16K 37/0041* (2013.01); *F16K 1/36* (2013.01);
(Continued)

(58) Field of Classification Search
CPC ........ F16K 31/53; F16K 37/0041; F16K 1/36; F16K 25/04; F16K 31/16–163;
(Continued)

(56) References Cited

U.S. PATENT DOCUMENTS 4,650,151 A    3/1987 McIntyre
4,744,386 A *  5/1988 Frazer ................. F16K 31/1221
                                                    137/315.29
(Continued)

FOREIGN PATENT DOCUMENTS

CN   201902656 U    7/2011
CN   203322452 U   12/2013
(Continued)

OTHER PUBLICATIONS

International Search Report with Written Opinion, dated Mar. 14, 2019, received in international patent application No. PCT/CN2018/123643, 13 pages (including English translations).
(Continued)

*Primary Examiner* — Marina A Tietjen
(74) *Attorney, Agent, or Firm* — Verrill Dana, LLP; Robert L. Hover (57) ABSTRACT

The present invention discloses an executive system for driving a valve to open and close, comprising a first housing, a linkage block, a first drive rod and a drive mechanism. Wherein, the first housing has a first inner cavity; a medium channel is provided in a side wall of the first housing; an outer peripheral wall of the linkage block is arranged on a wall of the first inner cavity in a slidable and sealed manner, and the linkage block partitions the first inner cavity into an upper cavity and a lower cavity; the medium channel is communicated with the upper cavity; a bottom part of the first drive rod sequentially passes through a top part of the first housing and the linkage block and extends into the lower cavity; a position-limiting part on the bottom part of the first drive rod blocks the linkage block within a region between the position-limiting part and the top part of the first housing; the drive mechanism is provided on top of the first drive rod. The degree of friction between an outer peripheral wall of the linkage block and an inner surface of the first (Continued)

housing is reduced, and the probability of a gap being produced between the peripheral wall of the linkage block and the inner wall of the first housing is reduced, so that the first drive rod can drive the valve stem to move into position, thereby increasing the reliability of the executive system controlling the valve to open and close.

10 Claims, 4 Drawing Sheets (51) Int. Cl.
    *F16K 31/143*    (2006.01)
    *F16K 31/50*    (2006.01)
    *F16K 37/00*    (2006.01)
    *F16K 1/36*    (2006.01)
    *F16K 25/04*    (2006.01)
    *F16K 31/16*    (2006.01)

(52) U.S. Cl.
    CPC .............. *F16K 25/04* (2013.01); *F16K 31/16* (2013.01); *F16K 37/0008* (2013.01)

(58) Field of Classification Search
    CPC .... F16K 31/122; F16K 31/143; F16K 31/508; E21B 34/02
    See application file for complete search history.

(56) References Cited

U.S. PATENT DOCUMENTS

| | | | |
|---|---|---|---|
| 2002/0175303 A1* | 11/2002 | Chatufale | F15B 1/24 251/62 |
| 2006/0065866 A1 | 3/2006 | Alfieri | |
| 2014/0137960 A1 | 5/2014 | Adams et al. | |
| 2015/0076378 A1* | 3/2015 | Sundararajan | F16K 31/122 251/63.5 |
| 2017/0292626 A1 | 10/2017 | Zhang et al. | |

FOREIGN PATENT DOCUMENTS

| | | |
|---|---|---|
| CN | 103527835 A | 1/2014 |
| CN | 203594862 U | 5/2014 |
| CN | 104819338 A | 8/2015 |
| CN | 106481830 A | 3/2017 |
| CN | 107076331 A | 8/2017 |
| CN | 107939981 A | 4/2018 |
| CN | 108506557 A | 9/2018 |
| CN | 208107283 U | 11/2018 |
| CN | 109538813 A | 3/2019 |

OTHER PUBLICATIONS

Extended European Search Report received in European Patent Application No. 18916634.1, dated Aug. 7, 2020, 10 pages.

* cited by examiner

EXECUTIVE SYSTEM FOR DRIVING A VALVE TO OPEN AND CLOSE

CROSS REFERENCE TO RELATED APPLICATIONS

The present application is the US National Stage of International Application No. PCT/CN2018/123643 filed on Dec. 25, 2018, which claims priority of the Chinese patent application filed with China National Intellectual Property Administration on Apr. 24, 2018 and having the application number of 201810373112.X and the invention title of "an executive system for driving a valve to open and close", the entire contents of each are incorporated in the present application by reference.

TECHNICAL FIELD

The present invention relates to the technical field of valves, and particularly relates to an executive system for driving a valve to open and close.

BACKGROUND

In equipment for mining and producing underwater gas and oil in oceans, an underwater valve and a valve executive mechanism apparatus are often used, the executive mechanism drives the underwater valve to open the valve, long-period maintenance-free working requirement is needed for the underwater valve and its executive mechanism, therefore, highly reliable underwater valves and executive mechanisms thereof have become a key factor for the design of underwater valve apparatuses.

For example, Chinese patent literature CN106481830A discloses a highly reliable hydraulic underwater valve which comprises an operation rod, a sleeve, a support base, a piston rod and a valve stem that are sequentially connected in a vertical direction from top to bottom. The piston rod has a rod body and a piston head fixedly connected to a bottom part of the rod body. The underwater valve having such structure is configured with two driving ways for opening and closing the valve, one of which is to use mechanical transmission to act on the operation rod to sequentially drive the sleeve and the support base, so as to control the up and down movement of the piston rod for controlling the valve to open and close; the other of which is by hydraulic driving wherein a hydraulic executive mechanism is used to drive the piston rod for controlling the valve to open and close.

The hydraulic executive mechanism comprises a hydraulic cylinder, a hydraulic source inlet and a hydraulic source outlet. Wherein, a peripheral wall of the piston head slides on an inner wall of the hydraulic cylinder vertically in a sealed manner, a sealed chamber is formed by a top surface of the piston head and the hydraulic cylinder, and by controlling the hydraulic medium at the hydraulic source inlet and the hydraulic source outlet to flow into or flow out of the sealed chamber, the piston head and the valve stem can be operated to move up or down, so as to control the valve to open or close.

In the executive structure for valve with the above-mentioned structure, during a process of mechanical transmission, the piston head is driven by the support base to slide up and down in the vertical direction, and because the peripheral wall of the piston head abuts against the inner wall of the hydraulic cylinder in a sealed manner, the sliding friction existing between the peripheral wall of the piston head and the hydraulic cylinder tends to be increased, and a certain degree of abrasion would be caused to the peripheral wall of the piston head, which causes a gap to be easily produced between the peripheral wall of the piston head and the inner wall of the hydraulic cylinder, and a phenomenon of hydraulic medium leakage would happen at such a gap, leading to that the hydraulic medium cannot sufficiently control the position of the piston rod, and as a result, the valve stem is not moved in position by the piston rod, causing the valve not to be able to open or close in position, and thus leading to the problem of poor reliability of the valve.

SUMMARY OF THE INVENTION

Thus, a technical problem to be solved by the present invention is that, when an executive system for driving a valve to open and close in the prior arts drives a valve stem to move, there is a problem that the valve stem cannot be moved in position and the valve has poor reliability.

To this end, the present invention provides an executive system for driving a valve to open and close, comprising:
  a first housing, having a first inner cavity, and also having at least one medium channel, provided in a side wall of the first housing and communicated with the first inner cavity;
  a linkage block, having an outer peripheral wall arranged on a wall of the first inner cavity in a slidable and sealed manner and partitioning the first inner cavity into an upper cavity at an upper position and a lower cavity at a lower position, the medium channel being communicated with the upper cavity;
  a first drive rod, having a bottom part sequentially passing through a top part of the first housing and the linkage block in a slidable and sealed manner and extending into the lower cavity, wherein a position-limiting part extending horizontally outwards is provided on an outer peripheral wall of the bottom part of the first drive rod, the position-limiting part blocks the linkage block within a region between the position-limiting part and the top part of the first housing, the bottom part of the first drive rod is adapted to be connected to a valve stem of the valve;
  a drive mechanism, provided on top of the first drive rod, for driving the first drive rod to move up and down.

Preferably, in the aforementioned executive system for driving a valve to open and close, the drive mechanism comprises
  a first driver 45;
  a first rotary shaft, with a top part driven by the first driver 45 to rotate;
  a conversion assembly, with a bottom part fixed on top of the first drive rod and a top part connected on an outer wall of the first rotary shaft, for converting a rotation movement of the first rotary shaft into a linear up-and-down movement.

More preferably, in the aforementioned executive system for driving a valve to open and close, the conversion assembly comprises
  a first transition sleeve, screw-fitted on the outer wall of the first rotary shaft;
  a second transition sleeve, fixed on a top part of the first drive rod;
  wherein a bottom part of the first transition sleeve abuts against a top part of the second transition sleeve; and
  a bottom part of the first rotary shaft extends into an inner bore of the second transition sleeve and has a reserved distance from the top part of the first drive rod.

More preferably, in the aforementioned executive system for driving a valve to open and close, the executive system further comprises a first barrel fixedly arranged relative to the first housing, sleeved outside the first transition sleeve and the second transition sleeve, and disposed over the first drive rod.

More preferably, in the aforementioned executive system for driving a valve to open and close, the drive mechanism also comprises
- at least one first guide groove provided on either of an outer wall of the first transition sleeve and an inner wall of the first barrel, and a first guiding element provided on the other one of the outer wall of the first transition sleeve and the inner wall of the first barrel, wherein, the first guiding element is correspondingly inserted into the first guide groove, and the first guide groove extends along a straight line or a helical line in a vertical direction;

and/or
- at least one second guide groove provided on either of an outer wall of the second transition sleeve and an inner wall of the first barrel, and a second guiding element provided on the other one of the outer wall of the second transition sleeve and the inner wall of the first barrel, wherein, the second guiding element is correspondingly inserted into the second guide groove, the second guide groove extends along a straight line or a helical line in a vertical direction.

More preferably, the aforementioned executive system for driving a valve to open and close further comprises
- a seat, fixed on the top part of the first drive rod and disposed outside the first barrel, wherein an inner wall of the seat together with an outer wall of the second transition sleeve encloses a space for the first barrel to be inserted into;
- at least one elastic member, arranged vertically between the seat and an outer wall of the first housing, wherein the elastic member exerts a biasing force on the seat in a direction towards the first rotary shaft.

More preferably, in the aforementioned executive system for driving a valve to open and close, the drive mechanism also comprises
- a second rotary shaft, provided on the first rotary shaft, with a top part of the second rotary shaft driven by the first driver 45 to rotate;
- a reducing mechanism, transmission-connecting a bottom part of the second rotary shaft with a top part of the first rotary shaft;
- wherein the reducing mechanism comprises a second gear wheel coaxially sleeved on the bottom part of the second rotary shaft, and a first gear wheel fixedly connected to the top part of the first rotary shaft, an outer surface of the second gear wheel being engaged with an outer surface of the first gear wheel.

More preferably, in the aforementioned executive system for driving a valve to open and close, the reducing mechanism also comprises a first transition wheel, arranged under the second gear wheel and the first gear wheel and sleeved on the top part of the first rotary shaft, and the top part of the first rotary shaft is connected to the first gear wheel through the first transition wheel.

More preferably, the aforementioned executive system for driving a valve to open and close further comprises a second housing sleeved on an outer wall of the first housing; wherein, the second housing and the first housing enclose a mounting cavity therebetween, and the first drive rod and the drive mechanism are both mounted inside the mounting cavity; and a balancer for regulating a pressure equilibrium between an inside of the mounting cavity and an aqueous environment where the valve is located.

More preferably, in the aforementioned executive system for driving a valve to open and close, a first opening is provided on a top part of the second housing, and the balancer comprises
- a third housing, sealedly mounted on top of the second housing and having a second inner cavity, wherein a second opening communicated with the first opening is provided in a bottom part of the third housing, a communicating hole is provided in a side wall and/or a top part of the third housing, and when a prescribed height of hydraulic medium is filled in the mounting cavity, the communicating hole is positioned above a liquid level of the hydraulic medium in the mounting cavity; and
- a conduction pipe, disposed outside the third housing, and having a connecting segment sealedly mounted on the communicating hole and an introducing segment sealedly mounted on a bottom part of the connecting segment, wherein the introducing segment has a bottom part extending downwards.

More preferably, in the aforementioned executive system for driving a valve to open and close, the connecting segment and the introducing segment are made of different anti-corrosion metal materials; the conduction pipe also comprises a transition segment sealedly connecting the bottom part of the connecting segment to a top part of the introducing segment, wherein the transition segment is made of a non-metallic anti-corrosion material.

The technical solutions provided by the present invention has the following advantages:

1. The executive system for driving a valve to open and close provided by the present invention comprises a first housing, a linkage block, a first drive rod and a drive mechanism. Wherein, the first housing has a first inner cavity; a medium channel is provided in a side wall of the first housing and communicated with the first inner cavity; an outer peripheral wall of the linkage block is arranged on a wall of the first inner cavity in a slidable and sealed manner, and the linkage block partitions the first inner cavity into an upper cavity at an upper position and a lower cavity at a lower position; the medium channel is communicated with the upper cavity; a bottom part of the first drive rod sequentially passes through a top part of the first housing and the linkage block in a slidable and sealed manner and extends into the lower cavity; a position-limiting part extending horizontally outwards is provided on an outer peripheral wall of the bottom part of the first drive rod, the position-limiting part blocks the linkage block within a region between the position-limiting part and the top part of the first housing; the bottom part of the first drive rod is adapted to be connected to a valve stem of the valve; the drive mechanism is provided on top of the first drive rod, for driving the first drive rod to move up and down.

In the executive system for driving a valve to open and close with this structure, when the hydraulic medium drives the valve stem to move, the hydraulic medium enters the upper cavity through the medium channel, the linkage block is driven by the driving force of the medium to move downwards, a bottom part of the linkage block abuts against the position-limiting part of the first drive rod, so that the first drive rod moves synchronously with the linkage block; when mechanically driven, because the first drive rod is slidable relative to the linkage block, the linkage block is not acted on by a driving force and would not change its position, but keep stationary in its original position; when the drive mechanism drives the first drive rod to move up and down, the linkage block is separated from the position-limiting part of the first drive rod, and thus the up-and-down movement of the first drive rod does not cause the linkage block to move up and down. Therefore, the degree of friction between the outer peripheral wall of the linkage block and the inner surface of the first housing is reduced, and the probability of a gap being produced between the peripheral wall of the linkage block and the inner wall of the first housing is reduced, so that the control of the movement position of the first drive rod by hydraulic medium when it is hydraulically driven is improved, and thus the first drive rod can drive the valve stem to move in position, so as to realize normal opening and closing of the valve, thereby increasing the reliability of the executive system controlling the valve to open and close.

2. In the executive system for driving a valve to open and close provided by the present invention, the drive mechanism comprises a first driver 45, a first rotary shaft and a conversion assembly. Wherein, a top part of the first rotary shaft is driven by the first driver 45 to rotate; a bottom part of the conversion assembly is fixed on top of the first drive rod, and a top part of the conversion assembly is connected on an outer wall of the first rotary shaft; the conversion assembly is for converting a rotation movement of the first rotary shaft into a linear up-and-down movement, so as to realize that the first rotary shaft drives the first drive rod and in turn drives the valve stem to move up and down.

Furthermore, the conversion assembly comprises a first transition sleeve screw-fitted on the outer wall of the first rotary shaft, and a second transition sleeve fixed on a top part of the first drive rod; wherein a bottom part of the first transition sleeve abuts against a top part of the second transition sleeve; and a bottom part of the first rotary shaft extends into an inner bore of the second transition sleeve and has a reserved distance from the top part of the first drive rod.

When the valve stem is mechanically driven to move, the rotation of the first rotary shaft makes the first transition sleeve move linearly, and the first transition sleeve drives the second transition sleeve to move the first drive rod up and down, but does not drive the linkage block to move synchronously; when driven by hydraulic medium, because there is only abutting contact between the bottom part of the first transition sleeve and the top part of the second transition sleeve, when the hydraulic medium drives the linkage block and the first drive rod to move downwards, the second transition sleeve and the first drive rod would become separated from the first transition sleeve, and when the first drive rod and the linkage block move upwards to return to the initial position, the top part of the second transition sleeve becomes abutting against the bottom part of the first transition sleeve, thus, it is ensured that, when hydraulic medium drives the first drive rod to move, the movement of the second transition sleeve would not cause movement of the first transition sleeve and the first rotary shaft, therefore, it is realized that the mechanical driving and the hydraulic driving operate independently from each other.

3. In the executive system for driving a valve to open and close provided by the present invention, a first barrel is sleeved outside the first transition sleeve and the second transition sleeve; the drive mechanism also comprises at least one first guide groove provided on either of an outer wall of the first transition sleeve and an inner wall of the first barrel, and a first guiding element provided on the other one of the outer wall of the first transition sleeve and the inner wall of the first barrel, wherein, the first guiding element is correspondingly inserted into the first guide groove, and the first guide groove extends along a straight line or a helical line in a vertical direction.

In the executive system for driving a valve to open and close with this structure, each first guiding element is inserted into each first guide groove in a corresponding manner, and the guiding direction of the first guide groove has a component of direction extending in the vertical direction, so as to ensure that the first transition sleeve has a component of displacement in the vertical direction, thereby guiding the up-and-down movement of the first transition sleeve.

4. The executive system for driving a valve to open and close provided by the present invention further comprises a seat fixed on the top part of the first drive rod, and at least one elastic member arranged vertically between the seat and an outer wall of the first housing, wherein, the elastic member exerts a biasing force on the seat in a direction towards the first rotary shaft.

In the executive system for driving a valve to open and close with this structure, when the first drive rod is driven, either hydraulically or mechanically, to move the valve stem downwards into a lowest point, the corresponding valve is in an open state, and the elastic member is in a compressed state; when the valve needs to be opened, the valve stem and the first drive rod need to be driven to move upwards, and as the hydraulic driving force or mechanical driving force acted on the first drive rod is removed, the elastic member would release its compression and drive the first drive rod, the valve stem and the seat to move upwards, so as to quickly close the valve. Furthermore, multiple elastic members are provided to be able to further accelerate the quick closing of the valve. That is to say, when there is no other acting force, the elastic member drives the seat, the first drive rod and the second transition sleeve to return to the initial position, so as to reliably close the valve.

5. In the executive system for driving a valve to open and close provided by the present invention, the reducing mechanism comprises a second gear wheel coaxially sleeved on the bottom part of the second rotary shaft, and a first gear wheel fixedly connected to the top part of the first rotary shaft, an outer surface of the second gear wheel being engaged with an outer surface of the first gear wheel.

In the executive system for driving a valve to open and close with this structure, the second gear wheel and the second rotary shaft are arranged coaxially and the outer surface of the second gear wheel is engaged with the outer surface of the first gear wheel for movement transmission, therefore, as compared to the second gear wheel, the first gear wheel is positioned farther away from the first rotary shaft. A first distance between a rotation axis of the first gear wheel and the axis of the second rotary shaft is larger than a second distance between a rotation axis of the second gear wheel and the axis of the second rotary shaft, so the rotation speed of the second gear wheel is faster than the rotation speed of the first gear wheel around the first rotary shaft, and the second rotary shaft has a rotation speed faster than that of the first rotary shaft, thereby realizing the purpose of speed-reduction to the first rotary shaft, and therefore, as a torsional force is acted on the second rotary shaft, the first rotary shaft outputs a larger torsional force, so as to ensure that a large enough torsional force drives the first drive rod and the valve stem to move into a corresponding open position or closed position with precision, thereby ensuring the reliability of the valve.

6. In the executive system for driving a valve to open and close provided by the present invention, the reducing mechanism also comprises a first transition wheel, arranged under the second gear wheel and the first gear wheel and sleeved on the top part of the first rotary shaft, and the top part of the first rotary shaft is connected to the first gear wheel through the first transition wheel.

In the executive system for driving a valve to open and close with this structure, an end of the first transition wheel is sleeved on an end of the first gear wheel, and among the first gear wheel and the first transition wheel, the first gear wheel serves as a driving member, the first transition wheel serves as a driven member, and as driven by the driving member, only the circumferential rotation of the first gear wheel around the second rotary shaft is transmitted to the first rotary shaft, thereby ensuring the transmission stability between the rotation speed of the first gear wheel around the second rotary shaft and the rotation speed of the first rotary shaft.

7. In the executive system for driving a valve to open and close provided by the present invention, the executive system further comprises a balancer for regulating a pressure equilibrium between an inside of the mounting cavity and an aqueous environment where the valve is located, a first opening is provided on a top part of the second housing; the balancer comprises a third housing sealedly mounted on top of the second housing and having a second inner cavity, wherein a second opening communicated with the first opening is provided in a bottom part of the third housing, a communicating hole is provided in a side wall and/or a top part of the third housing, and when a prescribed height of hydraulic medium is filled in the mounting cavity, the communicating hole is position above a liquid level of the hydraulic medium in the mounting cavity.

In the executive system for driving a valve to open and close with this structure, the third housing is arranged on top of the second housing, seawater enters the second inner cavity through the communicating hole and together with the hydraulic medium fills the second inner cavity. In a working state of the balancer, the seawater is in an upper position, and the hydraulic medium is in a lower position relative to the seawater due to its own weight, the seawater in the second inner cavity directly contacts a top liquid surface of the hydraulic medium, and along with variation of pressure in the second inner cavity and the mounting cavity, the height of the hydraulic medium in the second inner cavity rises or drops, thereby ensuring a equilibrium between the pressure in the two cavities and the underwater pressure. Furthermore, under the blocking effect of the hydraulic medium, seawater would not mix with the hydraulic medium and enter the mounting cavity, so that the executive system can operate normally and high reliability of the valve is ensured.

8. The executive system for driving a valve to open and close provided by the present invention comprises a conduction pipe disposed outside the third housing, the conduction pipe has a connecting segment sealedly mounted on the communicating hole and an introducing segment sealedly mounted on a bottom part of the connecting segment, wherein the introducing segment has a bottom part extending downwards. The connecting segment and the introducing segment are made of different anti-corrosion metal materials; the conduction pipe also comprises a transition segment sealedly connecting the bottom part of the connecting segment to a top part of the introducing segment, wherein the transition segment is made of a non-metallic anti-corrosion material.

In the executive system for driving a valve to open and close with this structure, the introducing segment is made of metal material, which emits metal ions into seawater so as to prevent marine organism from approaching the inlet and blocking the inflow or outflow of seawater to or from the second inner cavity; furthermore, by providing the transition segment, galvanic corrosion is prevented from happening between the connecting segment and the introducing segment, so that the service life of the valve balancer is increased.

BRIEF DESCRIPTION OF THE DRAWINGS

In order to more clearly describe the technical solutions in the specific embodiments of the present invention or in the prior art, hereinafter, the appended drawings used for describing the specific embodiments or the prior art will be briefly introduced. Apparently, the appended drawings described below are only some embodiments of the present invention, and for a person with ordinary skill in the art, without expenditure of creative labor, other drawings can be derived on the basis of these appended drawings.

FIG. 1 is a partial enlarged view of frame A in FIG. 1;

FIG. 1 is a structural schematic diagram of the balancer in Embodiment 1;

FIG. 1 is a structural enlarged view of circle B in FIG. 3;

FIG. 1 is a structural schematic diagram of the switch indication device in Embodiment 1;

FIG. 1 is a structural top view of the executive system for driving a valve to open and close provided in Embodiment 1.

REFERENCE SIGNS

1—first housing; 111—upper cavity; 112—lower cavity, 12—hydraulic inlet channel; 13—hydraulic outlet channel;
2—linkage block;
31—first drive rod, 311—position-limiting part, 32—seat, 33—split collar;
41—first rotary shaft; 45—first driver; 421—first transition sleeve; 422—second transition sleeve;
43—second rotary shaft; 441—second gear wheel; 442—first gear wheel; 4421—first protrusion; 4422—second protrusion; 443—first transition wheel; 4431—first groove; 444—second transition wheel; 4441—second groove; 4442—connection part; 445—third gear wheel;
5—first barrel;
6—elastic member;
7—second housing; 71—mounting cavity; 72—cover body; 721—first opening;
8—balancer; 81—third housing; 811—bottom plate; 812—side plate; 813—upper cover; 814—communicating hole; 815—second opening; 82—second inner cavity; 83—conduction pipe; 831—connecting segment; 832—introducing segment; 833—transition segment; 84—plug; 85—connector;
9—switch indication device; 91—first transmission shaft; 92—second barrel; 93—second transmission shaft; 94—indication pointer; 951—open indication mark; 952—shut indication mark.

DETAILED DESCRIPTION OF EMBODIMENTS

A clear and complete description of the technical solution of the present invention is given below, in conjunction with the appended drawings. Apparently, the described embodiments are part of, but not all of, the embodiments of the present invention. All the other embodiments, obtained by a person with ordinary skill in the art on the basis of the embodiments in the present invention without expenditure of creative labor, belong to the protection scope of the present invention.

In the description of the present invention, it should be noted that, terms such as "center", "above", "below", "left", "right", "vertical", "horizontal", "inside", "outside" refer to the orientation or positional relationship based on the illustration of the appended drawings, and are only for the purpose of facilitating and simplifying the description of the present invention, rather than indicating or implying that the apparatus or component referred to must have a particular orientation or must be configured or operated in a particular orientation, therefore should not be construed as a limitation towards the present invention. In addition, terms such as "first", "second", "third" are merely for the purpose of description and should not be construed as an indication or implication of relative importance thereof.

In the description of the present invention, it should be noted that, unless specifically defined or restricted otherwise, terms such as "mount", "interconnect", "connect" should be broadly construed, for example, it may be a fixed connection, a detachable connection or an integral connection; it may be a mechanical connection or an electrical connection; it may be either a direct connection or an indirect connection through an intermediate medium, or it may be an internal communication between two units. For a person skilled in the art, the specific meaning of the above terms in the present invention may be understood according to specific situations thereof.

In addition, the technical features involved in different embodiments of the present invention described below may be combined with one another as long as they do not conflict with one another.

Embodiment 1

This embodiment provides an executive system for driving a valve to open and close, as shown in FIG. 1 to FIG. 6, the executive system comprises: a first housing 1, a second housing 7, a linkage block 2, a first drive rod 31 and a drive mechanism.

Figure 1:
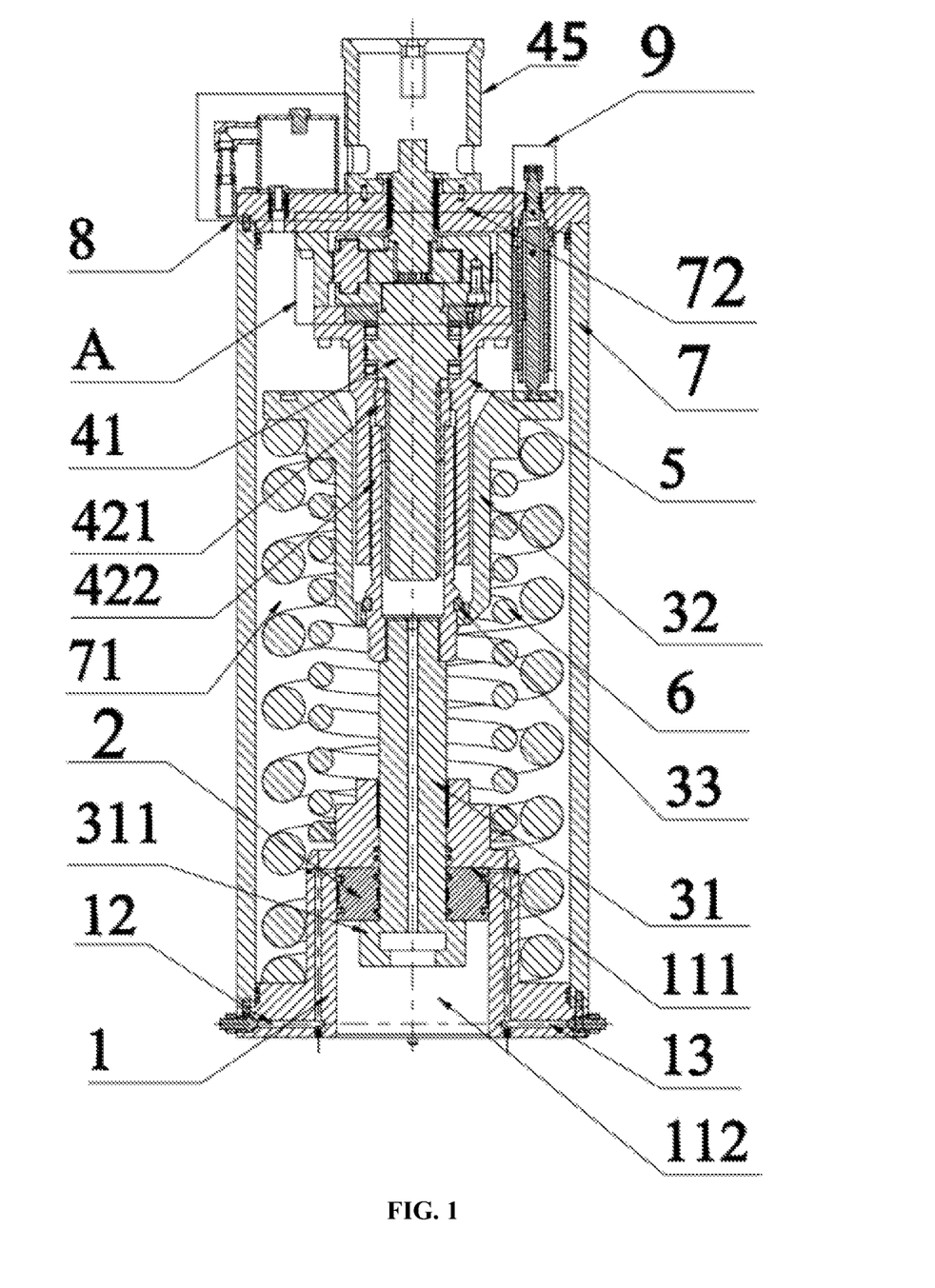
FIG. 1 is a structural schematic diagram of the executive system for driving a valve to open and close provided in Embodiment 1.

Wherein, a first inner cavity is provided inside the first housing 1; the linkage block 2 is provided in the first inner cavity, an outer peripheral wall of the linkage block 2 is arranged on a wall of the first inner cavity in a slidable manner, and the linkage block 2 partitions the first inner cavity into an upper cavity 111 at an upper position and a lower cavity 112 at a lower position; the second housing 7 is sleeved on an outer wall of the first housing 1, and a mounting cavity 71 is enclosed between the second housing 7 and the first housing 1, the drive mechanism is provided on top of the first drive rod 31, for driving the first drive rod 31 to move up and down, the drive mechanism and the first drive rod 31 are both mounted inside the mounting cavity 71, a bottom part of the first drive rod 31 sequentially passes through a top part of the first housing 1 and the linkage block 2 in a slidable and sealed manner and extends into the lower cavity 112, the bottom part of the first drive rod 31 is connected to a valve stem of the valve.

Specifically, two medium channels communicated with the first inner cavity are provided in a side wall of the first housing 1, including a hydraulic inlet channel 12 and a hydraulic outlet channel 13, the aforementioned medium channels are both communicated with the upper cavity 111, so that the medium can flow into and out of the first inner cavity through the medium channels, the medium inside the first inner cavity exerts a vertical hydraulic force on the linkage block 2, so as to ensure that the linkage block 2 is able to drive the valve stem to move downwards to open the valve, when the hydraulic force is larger than an elastic force of an elastic member 6 (described hereinafter) and the linkage block 2 is driven by the joint force of the two forces. A position-limiting part 311 extending horizontally outwards is provided on an outer peripheral wall of the bottom part of the first drive rod 31, the position-limiting part 311 blocks the linkage block 2 within a region between the position-limiting part 311 and the top part of the first housing 1, so that, after the medium flows into the first inner cavity, the linkage block 2 drives the first drive rod 31 to move up and down.

As shown in FIG. 1, the drive mechanism comprises a first rotary shaft 41, a second rotary shaft 43, a reducing mechanism, a first driver 45 and a conversion assembly.

Wherein, the second rotary shaft 43 is arranged above the first rotary shaft 41, a top part of the second rotary shaft 43 is driven by the first driver 45 to rotate and in turn drives the first rotary shaft 41 to rotate around an axis thereof; a bottom part of the second rotary shaft with a top part of the first rotary shaft are transmission-connected by the reducing mechanism; the conversion assembly has a bottom part fixed on top of the first drive rod 31 and a top part connected on an outer wall of the first rotary shaft 41; the conversion assembly converts a rotation movement of the first rotary shaft 41 into a linear up-and-down movement, so as to ensure that the present executive system can open and close the valve in a limited space.

As shown in FIG. 1, the executive system in this embodiment also comprises a first barrel 5, and the aforementioned conversion assembly comprises a first transition sleeve 421 and a second transition sleeve 422.

Wherein, the first barrel 5 is fixedly arranged relative to the first housing 1 and disposed over the first drive rod 31; the first barrel 5 is sleeved outside the first transition sleeve 421 and the second transition sleeve 422, the reducing mechanism, the first transition sleeve 421 and the second transition sleeve 422 are all sleeved inside the first barrel 5. The first transition sleeve 421 is fitted on the outer wall of the first rotary shaft 41 by a screw-threaded structure; a bottom part of the second transition sleeve 422 is fixed on a top part of the first drive rod 31; a bottom part of the first transition sleeve 421 abuts against a top part of the second transition sleeve 422. For example, the first transition sleeve 421 is a valve-stem nut.

Specifically, the first barrel 5 is fixed connected to a cover body 72 on the top part of the second housing 7 by a screw-threaded structure, the second transition sleeve 422 is fixed to the first drive rod 31 by screw-threaded locking; a bottom part of the first rotary shaft 41 extends into an inner bore of the second transition sleeve 422 and has a reserved distance from the top part of the first drive rod 31. The screw-fit between the valve-stem nut and the first rotary shaft 41 realizes conversion of movement modes between the two, the bottom part of the valve-stem nut is sleeved on top of the second transition sleeve 422, so as to further ensure effective transmission of the up-and-down movement. For example, the bottom part of the valve-stem nut has an extension part axially extending downwards, and an outer wall of the extension part is lap-jointed with an inner wall of the second transition sleeve 422.

For example, the valve-stem nut and the first barrel 5 are interconnected by splines extending vertically, wherein an outer wall of the valve-stem nut has external splines, and an inner wall of the first barrel 5 has internal splines, furthermore, the second transition sleeve 422 and the first barrel 5 are also interconnected by splines, wherein an outer wall of the second transition sleeve 422 has external splines, and an inner wall of the first barrel 5 has internal splines.

In the above structure, the internal and external splines have a lot of teeth, so the contact area between the splines are large, and therefore, a larger load can be borne, the load-bearing capability of the present executive system is thus increased; furthermore, when the first rotary shaft 41 rotates around an axis thereof, the internal and external splines ensures that the valve-stem nut and the second transition sleeve 422 both only move along the spline grooves so as to move up and down vertically relative to the first barrel 5, and in the meantime, it also ensures the centering of the valve-stem nut or the second transition sleeve 422 when driven by external force to move up and down, thereby further ensuring the stability of the process of the valve-stem nut or the second transition sleeve 422 moving coaxially with the first drive rod 31, and thus reliably controlling the valve to open and close.

When the valve stem is mechanically driven to move, the rotation of the first rotary shaft 41 causes the first transition sleeve 421 to move linearly, so as to cause the first transition sleeve 41 to drive the second transition sleeve 422 to move the first drive rod 31 up and down, but does not drive the linkage block 2 to move synchronously; when driven by hydraulic medium, because there is only abutting contact between the bottom part of the first transition sleeve 421 and the top part of the second transition sleeve 422, when the hydraulic medium drives the linkage block 2 and the first drive rod 31 to move downwards, the second transition sleeve 422 and the first drive rod 31 would become separated from the first transition sleeve 421, and when the first drive rod 31 and the linkage block 2 move upwards to return to the initial position, the top part of the second transition sleeve becomes abutting against the bottom part of the first transition sleeve, so as to ensure that, when hydraulic medium drives the first drive rod 31 to move, the movement of the second transition sleeve 422 would not cause movement of the first transition sleeve 421 and the first rotary shaft 41, therefore, it is achieved that the mechanical driving and the hydraulic driving operate independently from each other.

Figure 2:
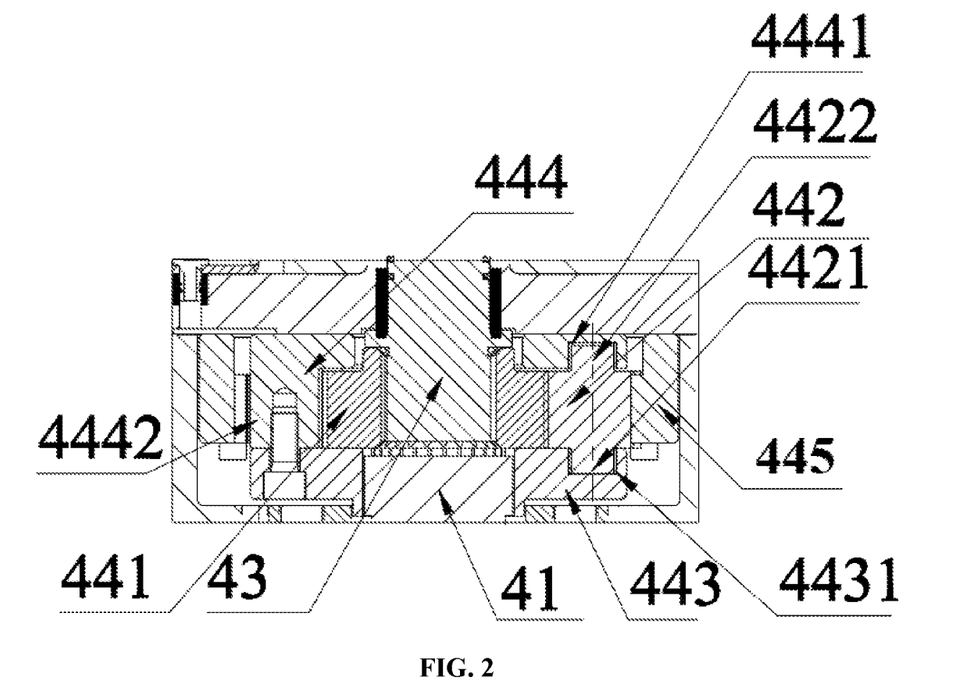

As shown in FIG. 1 and FIG. 2, the reducing mechanism provided by this embodiment comprises a second gear wheel 441, a first gear wheel 442, a third gear wheel 445, a first transition wheel 443 and a second transition wheel 444.

Wherein, the second gear wheel 441 is coaxially mounted to the second rotary shaft 43; the third gear wheel 445 is fixedly mounted to the cover body 72 by a screw-threaded structure; an outer surface of the first gear wheel 441 is engaged with an outer surface of the second gear wheel 442, and the outer surface of the second gear wheel 442 is engaged with an inner surface of the third gear wheel 445; the first transition wheel 443 is arranged under the second gear wheel 441 and the first gear wheel 442, and abuts against a bottom part of the first gear wheel 442; the first transition wheel 443 is sleeved on the top part of the first rotary shaft 41, and is coaxially mounted to the first rotary shaft 41; the second transition wheel 444 is sleeved outside the second rotary shaft 43 and positioned above the second gear wheel 441 and the first gear wheel 442, the second transition wheel 444 abuts against a top part of the first gear wheel 442; the first transition wheel 443 and the second transition wheel 444 are fixedly connected by a fastening structure. Preferably, three first gear wheels 442 are evenly provided around the axis of the second rotary shaft 43.

The reducing mechanism provided in this embodiment has a planetary gear reducing configuration, the first gear wheel 441 is equivalent to a sun gear, the first gear wheel 442 is a planet gear in the planetary gear system, and the third gear wheel 445 is a gear ring. Wherein, the sun gear serves as a driving member, the planet gear serves as a driven member, and the gear ring is stationary, so as to ensure that the first rotary shaft 41 fixedly connected to the planet gear moves at a reduced speed relative to the sun gear.

Specifically, because the second gear wheel 441 and the second rotary shaft 43 are arranged coaxially and the outer surface of the second gear wheel 441 is engaged with the outer surface of the first gear wheel 422 for movement transmission, therefore, as compared to the second gear wheel 441, the first gear wheel 442 is positioned farther away from the first rotary shaft 41. A first distance between a rotation axis of the first gear wheel 442 and the axis of the second rotary shaft 43 is larger than a second distance between a rotation axis of the second gear wheel 441 and the axis of the second rotary shaft 43, so the rotation speed of the second gear wheel 441 is faster than the rotation speed of the first gear wheel 442 around the first rotary shaft 41, and the second rotary shaft 43 has a rotation speed faster than that of the first rotary shaft 41, thereby realizing the purpose of speed-reduction to the first rotary shaft 41, and therefore, as a torsional force is acted on the second rotary shaft 43, the first rotary shaft 41 outputs a larger torsional force, so as to ensure that a large enough torsional force drives the first drive rod 31 and the valve stem to move into a corresponding open position or closed position with precision, thereby ensuring the reliability of the valve.

Specifically, as shown in FIG. 1 and FIG. 2, a bottom part of the first gear wheel 442 has a first protrusion 4421, and correspondingly, a top surface of the first transition wheel 443 is provided with a first groove 4431 at a position corresponding to the first protrusion 4421; the first protrusion 4421 is inserted in the first groove 4431. Similarly, a top part of the first gear wheel 442 has a second protrusion 4422, a bottom surface of the second transition wheel 444 is provided with a second groove 4441 at a position corresponding to the second protrusion 4422, and the second protrusion 4422 is inserted in the second groove 4441. In the cooperation between the first protrusion 4421 and the first groove 4431, as well as in the cooperation between the second groove 4441 and the second protrusion 4422, the groove-protrusion fit is a clearance fit, as long as it can be ensured that the first gear wheel 442 can rotate in the grooves of the first transition wheel 443 and the second transition wheel 444. In the movement transmission process of the first gear wheel 442, the first transition wheel 443 and the second transition wheel 444, the first gear wheel 442 serves as a driving member, the first transition wheel 443 and the second transition wheel 444 serve as driven members, and as driven by the driving member, only the circumferential rotation of the first gear wheel 442 around the second rotary shaft 43 is transmitted to the first rotary shaft 41, thereby ensuring the transmission stability between the rotation speed of the first gear wheel 442 around the second rotary shaft 43 and the rotation speed of the first rotary shaft 41.

As shown in FIG. 1 and FIG. 2, on a bottom surface of the second transition wheel 444 on a side away from the first gear wheel 442, the second transition wheel 444 has a connection part 4442 extending towards the first transition wheel 443, the connection part 4442 is positioned outside the second gear wheel 441; the connection part 4442 is fixedly connected to a top part of the first transition wheel 443 by a screw-threaded fastener, thereby further ensuring the stability of movement transmission.

The first rotary shaft 41 has a protruding shoulder extending radially outwards, both ends of the protruding shoulder are provided with a bearing, fixed by a bearing pressure cover. The bearings can support the first rotary shaft 41 to move around an axis thereof, and at the same time reduces the friction coefficient during the rotation process of the first rotary shaft 41, thereby ensuring the precision of its rotation and the torsional force transmitted through the first transition wheel 443.

As shown in FIG. 1, the executive system in this embodiment also comprises a seat 32 fixed on the top part of the first drive rod 31, the seat 32 is fixedly connected to the second transition sleeve 422 by a split collar 33. The seat 32 is disposed outside the first barrel 5, an inner wall of the seat 32 together with an outer wall of the second transition sleeve 422 encloses a space for the first barrel 5 to be inserted in.

The executive system in this embodiment also comprises an elastic member 6 arranged along the vertical direction. The elastic member 6 exerts a biasing force on the seat 32 in a direction towards the first rotary shaft 41. When the first drive rod 31 is driven, either hydraulically or mechanically, to move the valve stem downwards into a lowest point, the corresponding valve is in an open state, and the elastic member 6 is in a compressed state; when the valve needs to be opened, the valve stem and the first drive rod 31 need to be driven to move upwards, and as the hydraulic driving force or mechanical driving force acted on the first drive rod 31 is removed, the elastic member 6 would release its compression and drive the first drive rod 31, the valve stem and the seat 32 to move upwards, so as to quickly close the valve. Furthermore, multiple elastic members 6 are provided to be able to further accelerate the quick closing of the valve. That is to say, when there is no other acting force, the elastic member 6 drives the seat 32, the first drive rod 31 and the second transition sleeve 422 to return to the initial position, so as to reliably close the valve.

For example, in this embodiment, an outer wall of the first housing 1 is provided with a first annular step, the first annular step has a first step surface and a second step surface arranged sequentially in the vertical direction, and a first connection surface axially connecting the first step surface and the second step surface; an outer wall of the seat 32 is provided with a second annular step, the second annular step has a third step surface and a fourth step surface arranged sequentially in the vertical direction, and a second connection surface axially connecting the third step surface and the fourth step surface.

The elastic member 6 comprises a first spring and a second spring coaxially sleeved outside the first drive rod 31, the first spring has an intermediate diameter larger than that of the second spring. The first spring has its two ends respectively abuts against the second step surface and the third step surface, and is sleeved outside the first connection surface and the second connection surface; the second spring has its two ends respectively abuts against the first step surface and the fourth step surface. The aforementioned multiple springs together ensure the elastic position-restoring force, expand the selection range of springs, and thus save production cost.

Figure 3:
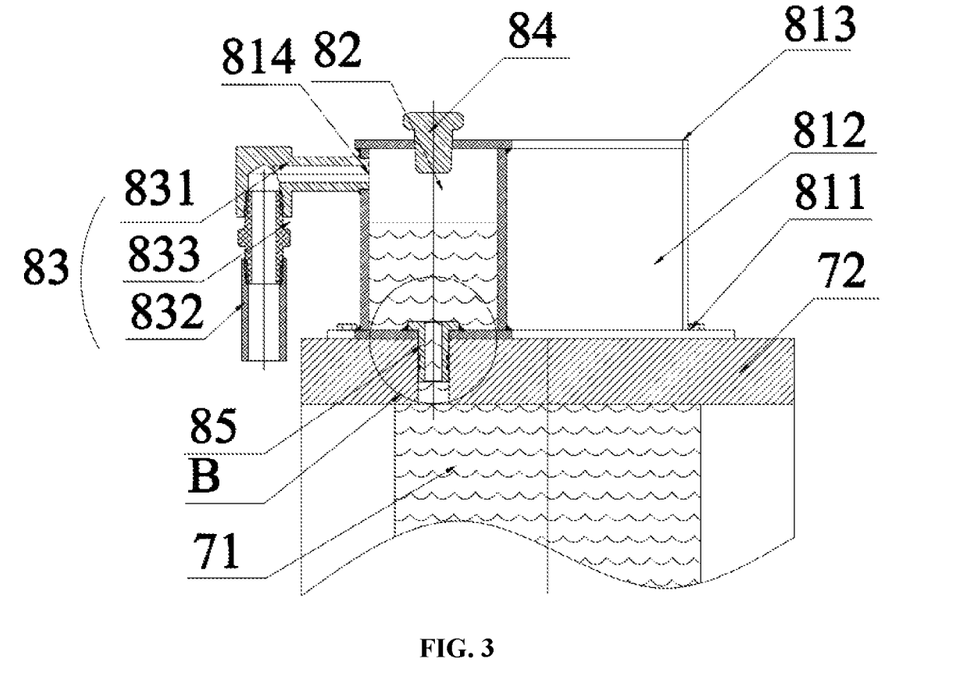
Figure 4:
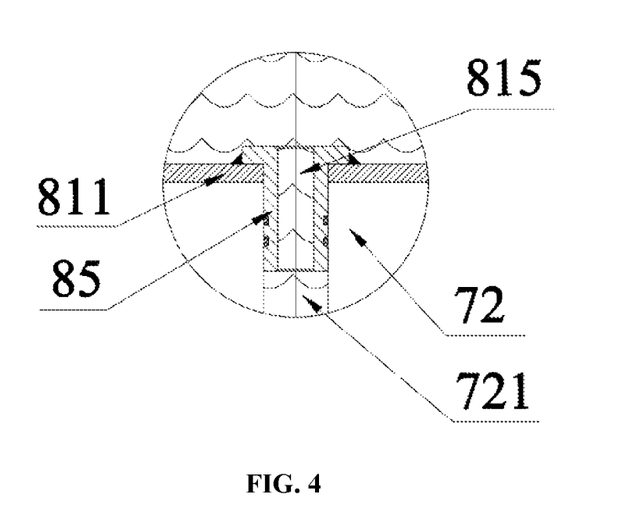

As shown in FIG. 3 and FIG. 4, the executive system provided by this embodiment also comprises a balancer 8 for regulating a pressure equilibrium between the mounting cavity 71 of the second housing 7 and an aqueous environment where the valve is located; the balancer 8 comprises a third housing 81 sealedly mounted on the second housing 81, and a conduction pipe 83 fixedly connected to the third housing 81.

Wherein, the third housing 81 has a second inner cavity 82, the cover body 72 is provided with a first opening 721, and a bottom part of the third housing 81 is provided with a second opening 815 communicated with the first opening 721, so that the mounting cavity 71 is intercommunicated with the second inner cavity 82. The conduction pipe 83 is fixedly mounted to a second side wall through a communicating hole 814 in the side wall of the third housing 81, and when a prescribed height of hydraulic medium is filled in the second inner cavity 82, the communicating hole 814 is positioned above a liquid level of the hydraulic medium in the second inner cavity 82.

The height of the liquid level of the hydraulic medium in the above-mentioned second inner cavity 82 depends on an inner-cavity volume of the driver, a water depth and parameters of the hydraulic medium, and is obtained by calculation thereof. Also, the hydraulic medium herein should select a hydraulic medium having a density larger than that of water and being environmentally friendly.

As shown in FIG. 3 and FIG. 4, in the above-mentioned balancer 8, the conduction pipe 83 has a connecting segment 831, an introducing segment 832 and a transition segment 833. Wherein, the connecting segment 831 is welded on the communicating hole 814, a top segment of the transition segment 833 is fixedly mounted along a bottom part of the connecting segment 831 in a sealed manner, and similarly, a top part of the introducing segment 832 is fixedly connected to a bottom segment of the transition segment 833 in a sealed manner, and a bottom part of the introducing segment 832 extends downwards in a direction towards the seafloor. For example, the connecting segment 831, the introducing segment 832 and the transition segment 833 are interconnected by NPT sealing threads.

Specifically, the connecting segment 831 has a lying-down L-shape, with an end of the horizontal part thereof being sealedly connected on the communicating hole 814, and with a bottom of the vertical part thereof being sealedly connected to the transition segment 833. The vertical cross-section of the outer wall of the transition segment 833 has a cross shape, so as to make it easy for the transition segment 833 to be respectively screwed tightly to the connecting segment 831 and the introducing segment 832.

Specifically, the connecting segment 831 and the introducing segment 832 are made of different anti-corrosion metal materials; the transition segment 833 is made of a non-metallic anti-corrosion material. For example, the connecting segment 831 is made of stainless steel, the introducing segment 832 is made of copper. The introducing segment 832 can emit metal ions into seawater, e.g. emitting copper ions as used in this embodiment, so that the introducing segment 832 using copper material can resist seawater corrosion; and the copper ions dissolved into seawater has a bactericidal action, which prevents marine organism stain and prevents marine organism from approaching the inlet and blocking the inflow or outflow of seawater to or from the second inner cavity 82; furthermore, as the copper introducing segment 832 and the stainless steel connecting segment 831 are made of two different metal materials, if the two segments are directly interconnected, a galvanic cell would be formed and would cause corrosion to the connecting segment 831 or the introducing segment 832, hence, by providing the non-metallic transition segment 833 between the connecting segment 831 and the introducing segment 832, the connecting segment 831 and the introducing segment 832 is prevented from being directly interconnected, and a galvanic cell is prevented from being formed, so that the service life of the balancer 8 is increased.

As shown in FIG. 3 and FIG. 4, in the above-mentioned balancer 8, the third housing 81 comprises a bottom plate 811 mounted on the cover body 72, a side plate 812 fixed on the bottom plate 811, and an upper cover 813 mounted on a top opening enclosed by the side plate 812. Wherein, the bottom plate 811 extends out of the side plate 812 in the horizontal direction, and the portion of the bottom plate 811 extending out of the side plate 812 is fixed on the cover body 72 by fasteners. For example, the bottom plate 811, the upper cover 813 and the side plate 812 are all made of stainless steel, thereby preventing corrosion by seawater in the marine environment; furthermore, by arranging the bottom plate 811 to extend horizontally out of the side plate 812, it is convenient for an installation personnel to fixedly mount the bottom plate 811 to the second housing 7, so as to facilitate the mounting and demounting.

As shown in FIG. 3 and FIG. 4, the top part of the third housing 81 is provided with a third opening, with a plug 84 inserted in the third opening in a sealable manner. The plug 84 is turned and inserted into the third opening by a threaded-fit, and air can be discharged out of the second inner cavity 82 through a clearance between the third opening and the plug 84, so that the purity of the hydraulic medium environment inside the valve is further ensured, and the reliability of the valve is further increased. The plug 84 in this embodiment is selected to be a double-phase stainless steel plug screw-inserted in the third opening.

As shown in FIG. 3 and FIG. 4, the second housing 7 and the third housing 81 are sealedly interconnected by a connector 85 inserted in the first opening 721 and the second opening 815, so that the intercommunication between the mounting cavity 71 and the second inner cavity 82 is ensured. The cross-section of the outer wall of the connector 85 has a T-shape, with a horizontal part of the T-shape extending in the second inner cavity 82 and the outer peripheral edge of the horizontal part being fixed on the bottom of the third housing 81 by welding, and with a vertical part of the connector 85 extending into the first opening 721 of the second housing 7; an annular sealing element is provided between the vertical part of the connector 85 and an inner wall of the first opening 721. For example, the annular sealing element is an O-shaped ring.

In the above-mentioned balancer 8, wherein, the third housing 81 is provided on top of the second housing 7, seawater enters the second inner cavity 82 through the communicating hole 814 and together with the prescribed hydraulic medium fills the second inner cavity 82. In a working state of the balancer 8, the seawater is in an upper position, and the hydraulic medium is in a lower position relative to the seawater due to its own weight, the seawater in the second inner cavity 82 directly contacts a top liquid surface of the hydraulic medium, and along with variation of pressure in the second inner cavity 82 and the mounting cavity 71, the height of the hydraulic medium in the second inner cavity 82 rises or drops, thereby ensuring a equilibrium between the pressure in the respective cavities and the underwater pressure. Furthermore, under the blocking effect of the hydraulic medium, seawater would not mix with the hydraulic medium and enter the mounting cavity 71, so that the executive system can operate normally and high reliability of the valve is ensured.

Figure 5:
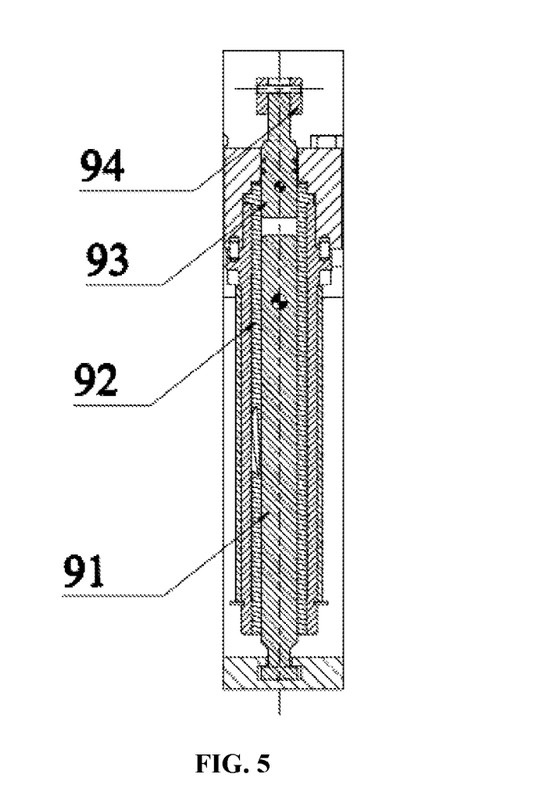
Figure 6:
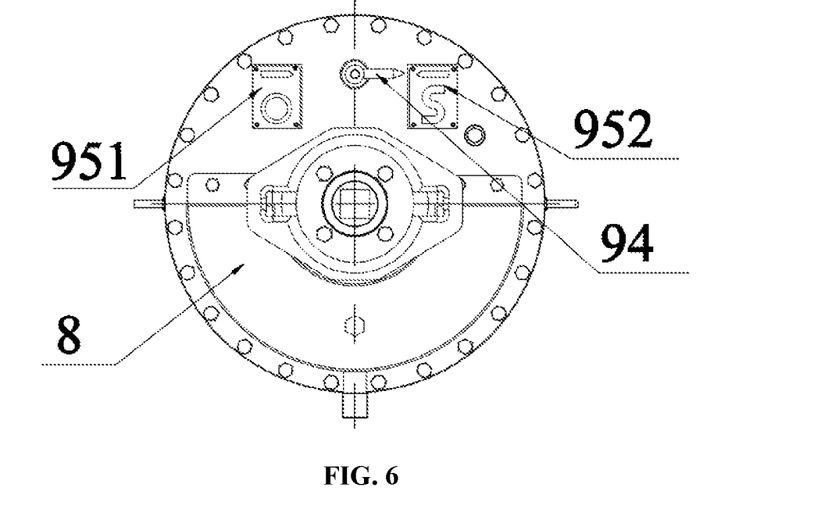

As shown in FIG. 5 and FIG. 6, the executive system of this embodiment is also provided with a switch indication device 9 for indicating the open-and-close position status of the valve, the switch indication device 9 comprises: a first transmission shaft 91, a second barrel 92, a second transmission shaft 93 and an indication pointer 94.

Wherein, a top part of the second barrel 92 is fixedly connected to a bottom part of the second transmission shaft 93 by a pin; the first transmission shaft 91 and the bottom part of the second transmission shaft 93 are provided in the second barrel 92; a bottom part of the first transmission shaft 91 is fixedly connected to a top part of the seat 32; the second transmission shaft 93 has its bottom part positioned in the mounting cavity 71 and has its top part extending out of the cover body 72 and being fixedly connected to one end of the indication pointer 94, the other end of the indication pointer 94 is suspending, the indication pointer 94 is vertically fixed to the transmission shaft.

The switch indication device also comprises an indication panel mounted on a top surface of the cover body 72, the indication panel is respectively mounted with an open indication mark 951 and a shut indication mark 952. The suspending end of the indication pointer 94 has two extreme positions for respectively pointing at the open indication mark 951 and the shut indication mark 952.

A third guiding element is provided on an outer wall of the first transmission shaft 91, a third guide groove is provided on an inner wall of the second barrel 92, the third guiding element is correspondingly inserted into the third guide groove, and the third guide groove extends along a helical line. For example, the third guiding element is a pin, and when the seat moves up or down in the vertical direction and the pin rises or lowers along the helical groove, the pin drives the second barrel 92 to rotate around an axis thereof, so that the suspending end of the indication pointer 94 rotates and accurately indicates the opening or closing of the valve.

The executive system for driving a valve to open and close provided by this embodiment has two working modes including hydraulically driving and mechanically driving. When the hydraulic driving mechanism malfunctions, the opening or closing of the valve can be controlled by mechanically driving.

In the hydraulically driving process, the executive system in this embodiment has the following working course of action:

(1) when the valve needs to be opened: firstly, hydraulic medium enters the upper cavity 111 through the hydraulic inlet channel 12, and under the driving action of the hydraulic force of the hydraulic medium in the upper cavity 111, the linkage block 2 moves vertically downwards; then, the linkage block 2 abuts against the position-limiting part 311 of the first drive rod 31 to move together therewith, and thus drives the valve stem fixedly connected on the bottom part of the first drive rod 31 to move vertically downwards; finally, when the valve stem reaches the open position, hydraulic medium input into the upper cavity 111 is stopped, the valve is in an open state from then on.

(2) when the valve needs to be closed: firstly, the hydraulic outlet channel 13 is opened, and the hydraulic medium flows out of the upper cavity 111 through the hydraulic outlet; then, under the action of the biasing force of the elastic member 6, the seat 32 brings the first drive rod 31 and in turn brings the linkage block 2 to move vertically upwards; finally, when the top part of the second transition sleeve 422 abuts against the bottom surface of the first transition sleeve 421, the valve stem is in a closed position, the top end of the linkage block 2 abuts against the inner wall of the first inner cavity, the valve is in a closed state from then on.

In the mechanical driving process, the executive system in this embodiment has the following working course of action:

(1) when the valve needs to be opened: firstly, the first driver 45 drives the second rotary shaft 43 to rotate and thus drives the reducing mechanism and the first rotary shaft 41 to rotate, then, the first transition sleeve 421 slides vertically downwards, and the first transition sleeve 421 pushes the second transition sleeve 422 and the first drive rod 31 to move downwards, finally, when the valve stem reaches the open position, the rotation of the first driver 45 is stopped, the valve is in an open state from then on.

(2) when the valve needs to be closed: firstly, the first driver 45 drives the second rotary shaft 43 to rotate in a reversed direction, the first transition sleeve 421 slides vertically upwards, and under the action of the biasing force of the elastic member 6, the second transition sleeve 422 is kept in a state of abutting against the bottom end of the first transition sleeve 421 and slides upwards together with the first transition sleeve 421, then, the first drive rod 31 brings the valve stem to move upwards, finally, when the first driver 45 becomes unable to rotate the second rotary shaft 43, the valve stem reaches the closed position, the valve is in a closed state from then on.

In the executive system for driving a valve to open and close provided in this embodiment, when the hydraulic medium drives the valve stem to move, the hydraulic medium enters the upper cavity 111 through the medium channel, the linkage block 2 is driven by the driving force of the medium to move downwards, a bottom part of the linkage block 2 abuts against the position-limiting part 311 of the first drive rod 31, so that the first drive rod 31 moves synchronously with the linkage block 2; when mechanically driven, because the first drive rod 31 is slidable relative to the linkage block 2, the linkage block 2 is not acted on by a driving force and would not change its position but keep stationary in its original position, so when the drive mechanism drives the first drive rod 31 to move up and down, the linkage block 2 is separated from the position-limiting part 311 of the first drive rod 31, and thus the up-and-down movement of the first drive rod 31 does not cause the linkage block 2 to move up and down, therefore, the degree of friction between the outer peripheral wall of the linkage block 2 and the inner surface of the first housing 1 is reduced, and the probability of a gap being produced between the peripheral wall of the linkage block 2 and the inner wall of the first housing 1 is reduced, so that the control of the movement position of the first drive rod 31 by hydraulic medium when it is hydraulically driven is improved, and thus the first drive rod 31 can drive the valve stem to move in position, so as to realize normal opening and closing of the valve, thereby increasing the reliability of the executive system controlling the valve to open and close.

Embodiment 2

The executive system for driving a valve to open and close provided in this embodiment, as compared to the executive system for driving a valve to open and close provided in Embodiment 1, has the following differences:

The position of the communicating hole 814 is changed, it may be provided in the top wall of the third housing 81, which can likewise fulfill that seawater enters the second inner cavity 82 through the communicating hole 814 and that a pressure equilibrium is kept between the seawater pressure and the oil pressure inside the second inner cavity 82, and the reliability of the valve is likewise ensured.

As for the way of connecting the conduction pipe 83 to the third housing 81, the fixed connection may be a threaded connection, as long as seawater can be successfully introduced into the second inner cavity 82 through the conduction pipe 83.

As a variation of the structure of the conduction pipe 83, the shape of the conduction pipe 83 may be a straight pipe, and seawater may likewise flow into the second inner cavity 82 through the conduction pipe 83.

As a variation of the structure of the conduction pipe 83, the conduction pipe 83 may only have the introducing segment 832, the introducing segment 832 may have an L-shape, as long as it is ensured that the conduction pipe 83 is communicated with seawater and introduces seawater into the second inner cavity 82.

As a further variation, there may be no conduction pipe 83, and seawater is introduced into the second inner cavity only by the communicating hole 814 in the third housing 81, which can likewise ensure that seawater enters the second inner cavity 82 through the communicating hole 814 positioned above a liquid level of the hydraulic oil in the second inner cavity 82, thereby balancing the pressures of seawater and the inside of the second inner cavity 82 and the first inner cavity.

Embodiment 3

The executive system for driving a valve to open and close provided in this embodiment, as compared to the executive system for driving a valve to open and close provided in Embodiment 1 or 2, has the following differences:

The first driver 45 may select any motor or other power take-off devices, as long as it is ensured that the first driver 45 can drive the second rotary shaft 43 to rotate and transmits a torsional force to the first gear wheel 442.

As a variation of the reducing mechanism, there may be no second transition wheel 444, and only the first transition wheel 443 sleeved on the first gear wheel 442 serves to transmit the intermediate torsional force.

Embodiment 4

The executive system for driving a valve to open and close provided in this embodiment, as compared to the executive system for driving a valve to open and close provided in any one of Embodiment 1 to 3, has the following differences:

There may be no first transition wheel 443 and no second transition wheel 444. Only the first gear wheel 442 is fixedly connected to the first rotary shaft 41, the first gear wheel 442 has an L-shaped structure, and an outer gear surface is provided, wherein, a horizontal part of the L-shape is fixedly connected to the first rotary shaft 41, a vertical part of the L-shape is rotatably connected with the outer gear surface, and the outer gear surface engages an outer side of the second gear wheel 441, which can likewise ensure the speed-reducing movement transmission towards the first rotary shaft 41 by the reducing mechanism.

Embodiment 5

The executive system for driving a valve to open and close provided in this embodiment, as compared to the executive system for driving a valve to open and close provided in any one of Embodiment 1 to 4, has the following differences:

There may be no second rotary shaft 43 and no reducing mechanism, the output end of the first driver 45 may directly acts on the top part of the first rotary shaft 41, so as to transmit a torque to the first rotary shaft 41.

Embodiment 6

The executive system for driving a valve to open and close provided in this embodiment, as compared to the executive system for driving a valve to open and close provided in any one of Embodiment 1 to 5, has the following differences:

The outer wall of the first transition sleeve 421 is provided with one first guide groove, and the inner wall of the first barrel 5 is provided with one first guiding element, the first guiding element is a vertical protrusion fixedly provided on the first barrel 5, as long as the vertical protrusion can slide along the first guide groove.

Alternatively, one first guiding element is provided on the first transition sleeve 421, and the inner wall of the first barrel 5 has one corresponding first guide groove, the first guiding element is a vertical protrusion fixedly provided on the first transition sleeve 421, as long as the vertical protrusion can slide along the first guide groove.

As a variation of the first guiding element, the first guiding element may be a pin which is inserted in the first guide groove and is fixedly provided on the first transition sleeve 421 or on the first barrel 5.

As a variation of the first guide groove, the first guide groove may extend along a helical line on the outer wall of the first transition sleeve 421 or on the inner wall of the first barrel 5, the first guiding element is correspondingly inserted into the first guide groove, the guiding direction of the first guide groove has a component of direction extending in the vertical direction, so as to ensure that the first transition sleeve 421 has a component of displacement in the vertical direction, thereby guiding the up-and-down movement of the first transition sleeve 421.

The number of the first guiding elements in this embodiment may also be two, three, etc., and the number of the corresponding first guide grooves may be set accordingly, and with the increased number of guiding elements, the stability of the opening and closing of the executive system is also improved.

Embodiment 7

The executive system for driving a valve to open and close provided in this embodiment, as compared to the executive system for driving a valve to open and close provided in any one of Embodiment 1 to 6, has the following differences:

The outer wall of the second transition sleeve 422 is provided with one second guide groove, and the inner wall of the first barrel 5 is provided with one second guiding element, the second guiding element is a vertical protrusion fixedly provided on the first barrel 5, as long as the vertical protrusion can slide along the second guide groove.

Alternatively, one second guiding element is provided on the second transition sleeve 422, and the inner wall of the first barrel 5 has one corresponding second guide groove, the second guiding element is a vertical protrusion fixedly provided on the second transition sleeve 422, as long as the vertical protrusion can slide along the second guide groove.

As a variation of the second guiding element, the second guiding element may be a pin which is inserted in the second guide groove and is fixedly provided on the second transition sleeve 422 or on the first barrel 5.

As a variation of the second guide groove, the second guide groove may extend along a helical line on the outer wall of the second transition sleeve 422 or on the inner wall of the first barrel 5, and as long as it is ensured that the highest point and the lowest point of the groove body of the second guide groove have a height difference in the vertical direction, it can be ensured that the second transition sleeve 422 has a component of displacement in the vertical direction, thereby ensuring that the drive mechanism can convert a rotation movement into an up-and-down movement in the vertical direction.

The number of the second guiding elements in this embodiment may also be two, three, etc., and the number of the corresponding second guide grooves may be set accordingly, and with the increased number of guiding elements, the stability of the opening and closing of the executive system is also improved.

Apparently, the aforementioned embodiments are merely examples illustrated for giving a clear description, rather than limiting the implementation ways thereof. For a person with ordinary skill in the art, various changes and modifications in other different forms can be made on the basis of the aforementioned description. It is unnecessary and impossible to exhaustively list all the implementation ways herein. However, any obvious changes or modifications derived from the aforementioned description are intended to be embraced within the protection scope of the present invention.

The invention claimed is:

1. An executive system for driving a valve to open and close, comprising:
a first housing, having a first inner cavity, and also having at least one medium channel, provided in a side wall of the first housing and communicated with the first inner cavity;
a linkage block, having an outer peripheral wall arranged on a wall of the first inner cavity in a slidable and sealed manner and partitioning the first inner cavity into an upper cavity at an upper position and a lower cavity at a lower position, the medium channel being communicated with the upper cavity;
a first drive rod, having a bottom part sequentially passing through a top part of the first housing and the linkage block in a slidable and sealed manner and extending into the lower cavity, wherein a position-limiting part extending horizontally outwards is provided on an outer peripheral wall of the bottom part of the first drive rod, the position-limiting part blocks the linkage block within a region between the position-limiting part and the top part of the first housing, the bottom part of the first drive rod is adapted to be connected to a valve stem of the valve;
a drive mechanism, provided on top of the first drive rod, for driving the first drive rod to move up and down, wherein the drive mechanism comprises:
a first driver;
a first rotary shaft, with a top part driven by the first driver to rotate;
a conversion assembly, with a bottom part fixed on top of the first drive rod and a top part connected on an outer wall of the first rotary shaft, for converting a rotation movement of the first rotary shaft into a linear up-and-down movement.

2. The executive system according to claim 1, wherein, the conversion assembly comprises
   a first transition sleeve, screw-fitted on the outer wall of the first rotary shaft;
   a second transition sleeve, fixed on a top part of the first drive rod;
   wherein a bottom part of the first transition sleeve abuts against a top part of the second transition sleeve; and
   a bottom part of the first rotary shaft extends into an inner bore of the second transition sleeve and has a reserved distance from the top part of the first drive rod.

3. The executive system according to claim 2, further comprising a first barrel fixedly arranged relative to the first housing, sleeved outside the first transition sleeve and the second transition sleeve, and disposed over the first drive rod.

4. The executive system according to claim 3, wherein, the drive mechanism also comprises one or both of
   at least one first guide groove provided on either of an outer wall of the first transition sleeve and an inner wall of the first barrel, and a first guiding element provided on the other one of the outer wall of the first transition sleeve and the inner wall of the first barrel, wherein, the first guiding element is correspondingly inserted into the first guide groove, and the first guide groove extends along a straight line or a helical line in a vertical direction; and
   at least one second guide groove provided on either of an outer wall of the second transition sleeve and an inner wall of the first barrel, and a second guiding element provided on the other one of the outer wall of the second transition sleeve and the inner wall of the first barrel, wherein, the second guiding element is correspondingly inserted into the second guide groove, the second guide groove extends along a straight line or a helical line in a vertical direction.

5. The executive system according to claim 3, further comprising a seat, fixed on the top part of the first drive rod and disposed outside the first barrel, wherein an inner wall of the seat together with an outer wall of the second transition sleeve encloses a space for the first barrel to be inserted into;
   at least one elastic member, arranged vertically between the seat and an outer wall of the first housing, wherein the elastic member exerts a biasing force on the seat in a direction towards the first rotary shaft.

6. The executive system according to claim 1, wherein, the drive mechanism also comprises
   a second rotary shaft, provided on the first rotary shaft, with a top part of the second rotary shaft driven by the first driver to rotate;
   a reducing mechanism, transmission-connecting a bottom part of the second rotary shaft with a top part of the first rotary shaft;
   wherein the reducing mechanism comprises a second gear wheel coaxially sleeved on the bottom part of the second rotary shaft, and a first gear wheel fixedly connected to the top part of the first rotary shaft, an outer surface of the second gear wheel being engaged with an outer surface of the first gear wheel.

7. The executive system according to claim 6, wherein, the reducing mechanism also comprises a first transition wheel, arranged under the second gear wheel and the first gear wheel and sleeved on the top part of the first rotary shaft, and the top part of the first rotary shaft is connected to the first gear wheel through the first transition wheel.

8. The executive system according to claim 1, further comprising
   a second housing sleeved on an outer wall of the first housing; wherein, the second housing and the first housing enclose a mounting cavity therebetween, and the first drive rod and the drive mechanism are both mounted inside the mounting cavity; and
   a balancer for regulating a pressure equilibrium between an inside of the mounting cavity and an aqueous environment where the valve is located.

9. The executive system according to claim 8, wherein, a first opening is provided on a top part of the second housing, and the balancer comprises:
   a third housing, sealedly mounted on top of the second housing and having a second inner cavity, wherein a second opening communicated with the first opening is provided in a bottom part of the third housing, a communicating hole is provided in one or both of a side wall and a top part of the third housing, and when a prescribed height of hydraulic medium is filled in the mounting cavity, the communicating hole is positioned above a liquid level of the hydraulic medium in the mounting cavity; and
   a conduction pipe, disposed outside the third housing, and having a connecting segment sealedly mounted on the communicating hole and an introducing segment sealedly mounted on a bottom part of the connecting segment, wherein the introducing segment has a bottom part extending downwards.

10. The executive system according to claim 9, wherein, the connecting segment and the introducing segment are made of different anti-corrosion metal materials; the conduction pipe also comprises a transition segment sealedly connecting the bottom part of the connecting segment to a top part of the introducing segment, wherein the transition segment is made of a non-metallic anti-corrosion material.

* * * * *